April 16, 1935.  R. M. THOMPSON  1,997,611
COMBINED PRESS AND FILTER DEVICE
Filed Jan. 19, 1931   7 Sheets-Sheet 4

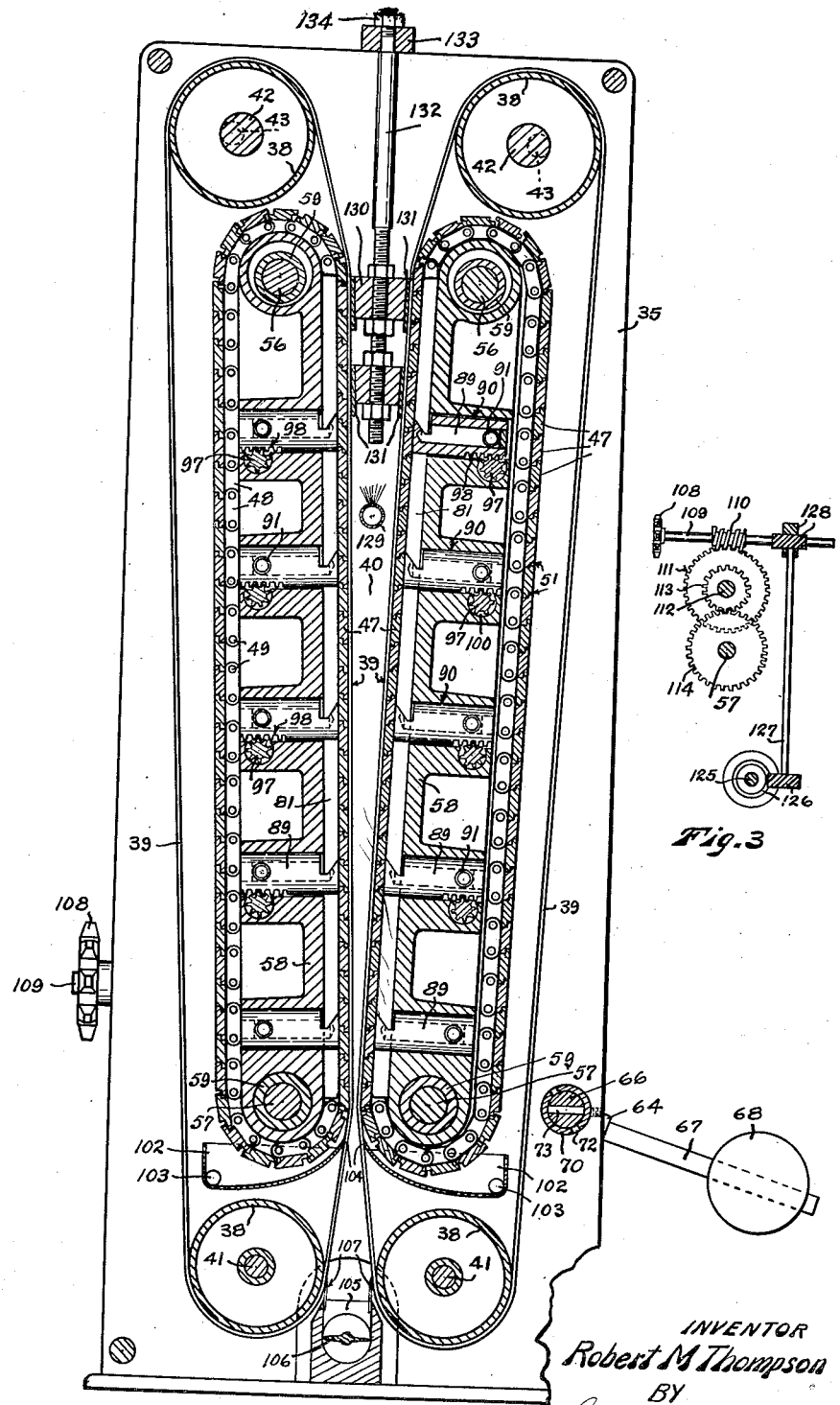

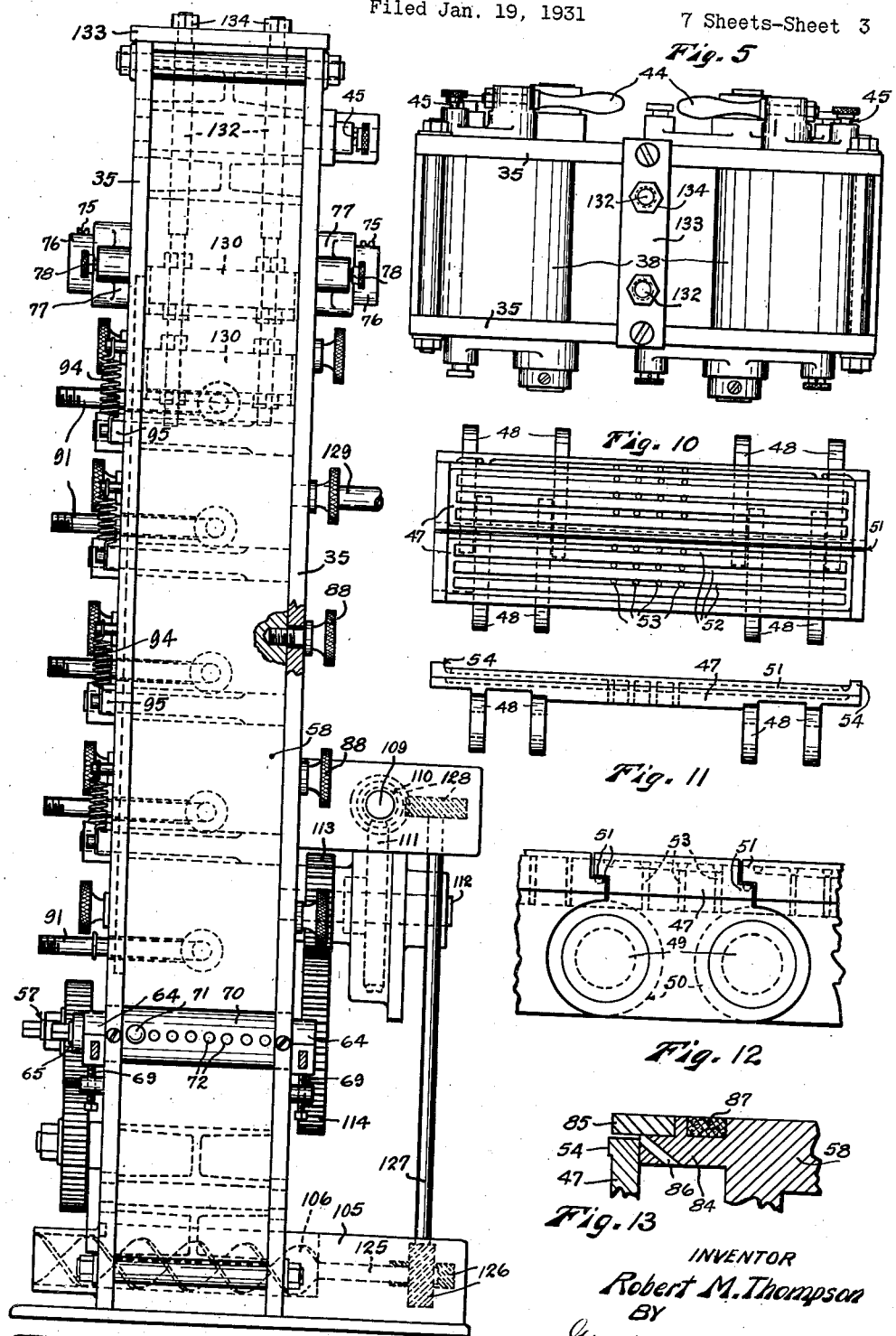

Inventor
Robert M Thompson
By
Attorney

INVENTOR
Robert M Thompson
BY
G. Wright Arnold
ATTORNEY

April 16, 1935.　　　　R. M. THOMPSON　　　　1,997,611
COMBINED PRESS AND FILTER DEVICE
Filed Jan. 19, 1931　　　7 Sheets-Sheet 6
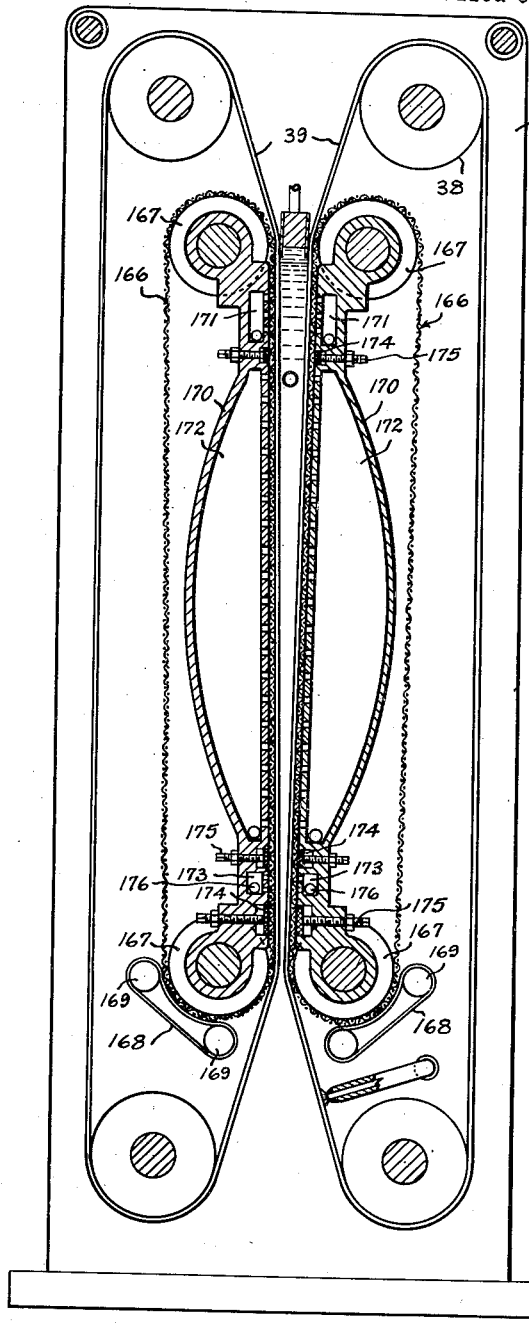
Fig. 20.
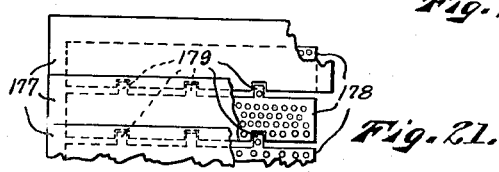
Fig. 21.
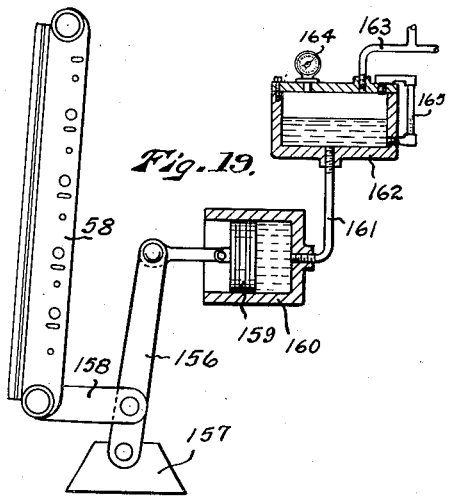
Fig. 22.
Fig. 23.
Fig. 19.
INVENTOR
Robert M Thompson
BY
G. Wright Arnold.
ATTORNEY April 16, 1935. R. M. THOMPSON 1,997,611
COMBINED PRESS AND FILTER DEVICE
Filed Jan. 19, 1931 7 Sheets-Sheet 7

INVENTOR
Robert M. Thompson
BY
G. Wright Arnold
ATTORNEY

Patented Apr. 16, 1935

1,997,611

UNITED STATES PATENT OFFICE 1,997,611

COMBINED PRESS AND FILTER DEVICE

Robert M. Thompson, Seattle, Wash., assignor to Thompson Continuously Operating Filter Press Company, a corporation of Washington Application January 19, 1931, Serial No. 509,595

21 Claims. (Cl. 210—197)

My invention relates to the art of devices designed to separate liquids from liquids of greater flowability, and liquids from solids.

More particularly, my invention relates to a combined press and filter device designed for continuous operation. My present invention is in the nature of an improvement on the filter device disclosed in my prior Patent No. 1,778,342, issued October 14, 1930.

It is common practice in the art of filtration to refer to devices designed for the separation of materials by the application of force or pressure to the materials from without, as "presses"; while devices designed for the separation of materials by having the force or pressure transmitted through the materials themselves as "filter presses". "Filter presses" are usually used where the amount of solids to be separated out is but a small proportion of the total mobile mass composed of said solids and liquids in which said solids are disposed and hence the said materials are pumped into the filter press. "Presses" on the other hand, are used where the proportion of solid matter is much greater in relation to that of the liquid composing said materials to be filtered. The distinction between the two devices will develop clearly in the following paragraphs.

In the industrial arts filtration is very often a costly item in the manufacturing process. This is due in part to the intermittent character of the operation of the filter devices and to the large amount of manual attention which is incident thereto. Moreover, in the filtering process there are points at which the expressed liquids are more clear than at other points. This is particularly true during the early stages of the separating process due to the liquids passing through the filtering medium before a deposit of the retained solids on the filtering medium has accumulated, which retained solids usually form the real filtering medium, such early liquids usually being termed "cloudy filtrate". By separately drawing off the cloudy portion of the expressed liquid during the early stages of the filtration process, a minimum quantity of the cloudy filtrate is retained with the clear filtrate.

Objection obtains to the devices as heretofore designed in the leakage that takes place by the joints formed between the stationary parts and moving parts of the device. Furthermore, serious objection obtains in that the great pressures developed are difficult of control and result in breaking of the machine.

In connection with the filtration part of the manufacturing process it is frequently desirable to have a device which may be employed both as a press and as a filter press. The filter devices as heretofore designed are not capable of this dual use. This involves the installation of both devices which involves great expense as well as the loss of important floor space.

The objects of my invention, in general, are to overcome the objections to the devices as heretofore constructed. A primary object of my invention is to provide a combined press and filter press; another primary object of my invention is to provide such a device for continuous operation which will have a filter chamber bounded by one or more filter belts supported in part or in whole by a movable frame, the pressure upon the materials retained on the filtering medium at the discharge end of said chamber being automatically controlled and adjustable. A further primary object of my invention is to provide means for drawing off the expressed liquids at the different stages of the filtration process whereby the clear liquids may be kept separate from the less clear. Another primary object is to provide, in combination with such continuous operating filter device, an improved slat belt to support the filter belt and to provide means for maintaining said filter belt and slat belt, under the desired tension, to facilitate the expressing process. Still another primary object of my invention is to provide one filter belt to move faster than the other filter belt in order that a "slip" may be provided for handling impervious materials, whereby the liquids may be worked mechanically to the outside of the mass to expose said liquids to the filter walls. Another object of my invention is to provide a pressure chamber without side packing strips.

Another object of my invention is to provide a discharge, the opening of which is not fixed but is automatically adjusted by the pressure developed in the discharging materials. Another object is to provide a filtering tight pressure chamber using moving belt walls. Another object is to provide against the mingling of cloudy and clear filtrate. Another object is to provide a belt combining both the reinforcing belt and the filtering belt, doing away with one belt. A further object of my invention is to provide means for very efficiently removing by replacement all liquids from the solid portion of the materials to be separated. Finally, a primary object of my invention is to provide such a filter device that the separation process may be facilitated not only by providing a vacuum and by imparting a movement to the materials to be filtered, but also by providing for the action of electricity to facilitate said separating process. A still further object of my invention is to provide a filter press having a continually changing filtering medium.

The above mentioned general objects of my invention, together with others inherent in the same are attained by the mechanism illustrated in the following drawings, the same being preferred exemplary forms of embodiment of my invention, throughout which drawings like reference numerals indicate like parts:

Fig. 2 is a view in vertical cross section of the same;

Fig. 3 is a diagrammatic drawing illustrating certain driving mechanism for the same;

Fig. 4 is a view in elevation showing one side of the device embodying my invention;

Fig. 5 is a view looking down on top of the same;

Fig. 10 is a plan view of two of the slats from which a slat belt is constructed;

Fig. 11 is a view in elevation showing the edge of one of such slats;

Fig. 12 is a fragmentary view in elevation on a larger scale showing the ends of several of said slats and the manner of uniting the same to form a slat belt;

Fig. 13 is a fragmentary sectional detail showing parts of the swinging frame member;

Fig. 19 shows a combined pneumatic and hydraulic means for supporting the movable jaw member in such a manner that it will yield if subjected to excessive pressure;

Fig. 20 is a view in vertical section of a filter device embodying my invention in which the slat belt is dispensed with, and the filter belts are supported by endless belts of wire mesh;

Fig. 21 is a plan view showing perforated slats arranged to form a slat belt and having overlapping pieces of filter belt material secured thereon;

Fig. 22 is a sectional view of the combined slat and filter belt as it appears when passing around a sprocket pulley, a roller being shown for the purpose of bending the overlapping ends and edges of the filter cloth down;

Fig. 23 is a fragmentary sectional view showing a perforated packing strip for the edge of the filter belt and showing the filter belt carried on a belt of metal strips or mesh that is supported by a corrugated wall;

Figure 1:
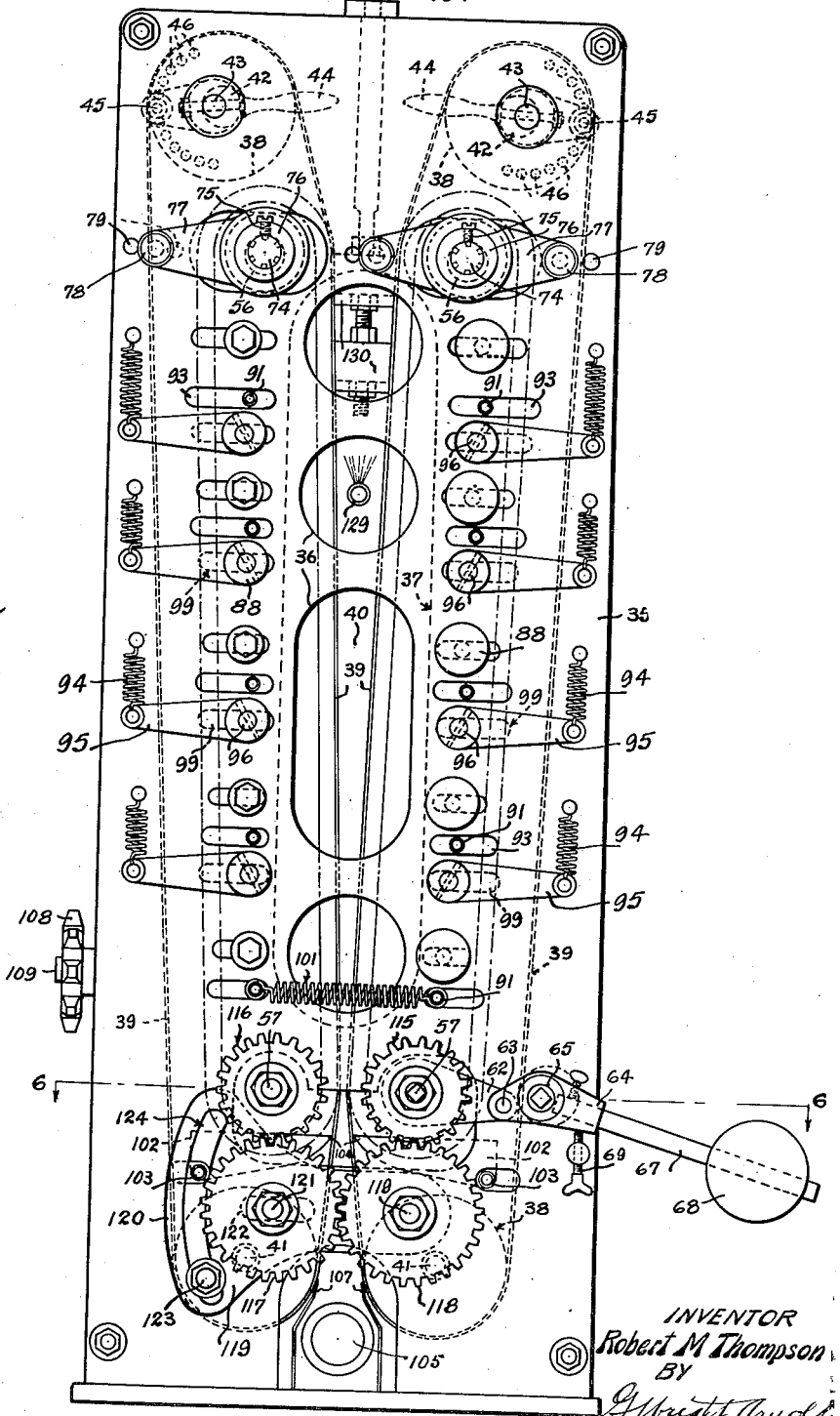
Figure 1 is a view in side elevation of a device embodying my invention.
Figure 6:
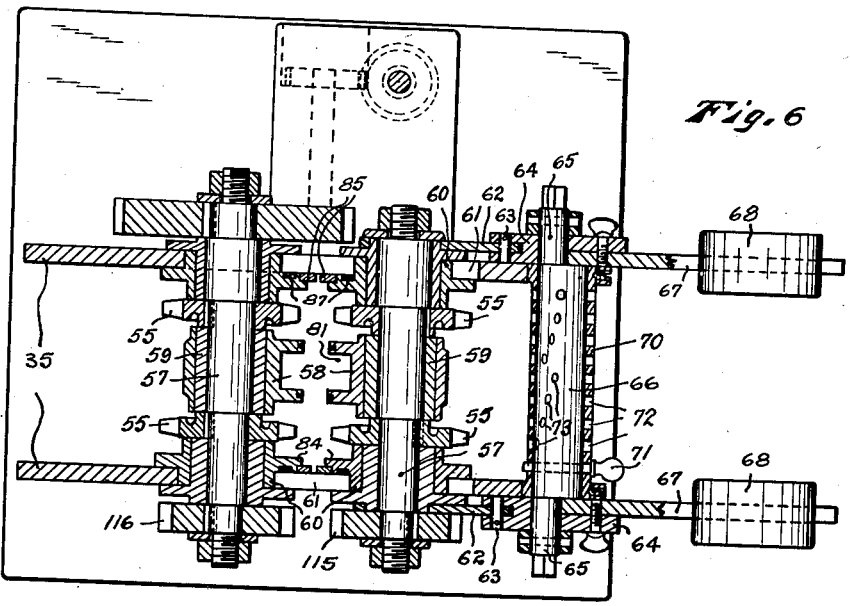
Fig. 6 is a sectional view substantially on broken line 6, 6 of Fig. 1 with certain filter belts and slats removed.
Figures 7, 8, 9:
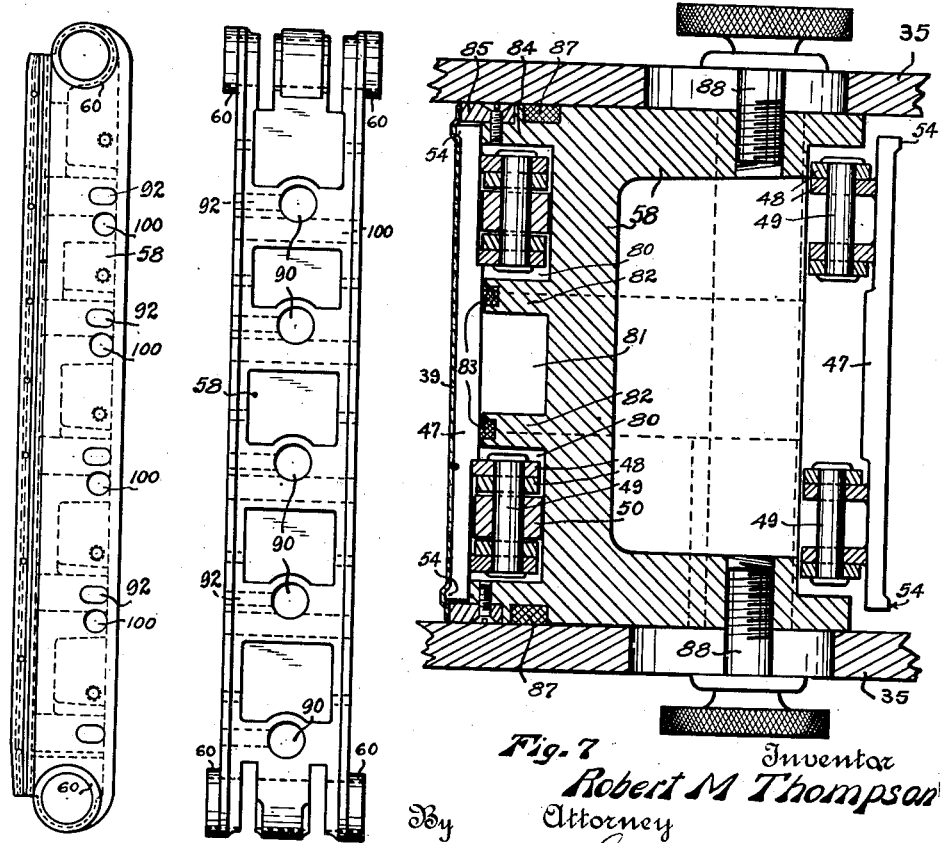
Fig. 7 is a fragmentary sectional view on a larger scale showing one of the movably mounted jaw members together with the filter belt and the slat belt and parts of the side plates.
Fig. 8 is a detached view in side elevation of one of the movably mounted jaw members.
Fig. 9 is a view in elevation showing the back side of said jaw member.

Referring to Figs. 1 to 12 inclusive, I have shown a filter device comprising two relatively fixed upright parallel side plates 35 that are supported in spaced apart relation and one of which is preferably provided with sight openings 36 and has a glass plate 37 inserted in the interior wall thereof.

Operatively disposed between the side plates or end walls 35, and movable on suitable pulleys or rollers 38, are two endless filter belts 39 whose opposing inner portions are preferably inclined with respect to each other to form a wedge shaped or convergent filter pressure chamber 40. The wedge form of the chamber functions to facilitate the application of pressure to that portion of the material from which part of the liquids have been expressed.

The lower rollers 38 are mounted on transverse shafts 41 that are supported in the side plates 35 and the upper rollers 38 are mounted on transverse shafts 42 which have eccentric bearing studs 43 on the ends thereof, which are journaled in the side plates 35 and have lever arms 44 secured thereto at one end of each shaft so that the shafts 42 may be turned on the eccentric bearing studs 43 to raise and lower the rollers 38 and tighten or loosen the belts 39. The lever arms 44 are provided at one end with spring pressed plungers 45 which are arranged to enter perforations 46 in the side plates to hold the lever arms in adjusted positions.

The filter belts are arranged to be supported on endless slat belts formed of slats 47, each of which are provided with spaced apart lugs 48 that form links which interfit the links on the adjacent slats and are pivotally secured thereto by pins 49. Rollers 50 are provided on the pins 49 between the links 48 to roll on trackways hereinafter explained.

The slats 47 are preferably rabbeted on the edges as at 51 so that they will overlap each other in ship lap fashion and the outer surfaces of such slats may be provided with longitudinal and transverse grooves 52 that are tapped by perforations 53 which extend through the slats so that liquid may flow along the grooves lengthwise of the slats and be discharged through the perforations. The ends of the slats are provided with raised portions or ledges 54 to prevent liquid from flowing outwardly over such ends and to prevent cloudy liquor from the edges from flowing inwardly toward the center, the ledges 54 being used in addition to the transverse grooves 52 shown in Figs. 10, 11, and 12 to raise the edges of the filter belt in the manner shown in Fig. 7.

The slats 47 with their connections form endless slat belts that are carried on sprocket wheels 55 which are mounted on shafts 56 and 57 at the upper and lower ends respectively of swinging frame member 58, bushings 59 preferably being provided within the frame members 58 for the shafts 56 and 57 to rotate in.

The swinging frame members 58 are provided at their top and bottom ends with outwardly directed bosses 60 that project through slots 61 in the side plates 35 and one of the swinging frame members is connected at the lower end and on both sides with links 62, the outer ends of which are secured by pivots 63 to the ends of levers 64 that are pivoted on eccentric pins or studs 65 on the ends of a shaft 66. The levers 64 have outwardly projecting separable arms 67 on which a weight 68 is adjustably secured and such levers are adjustably supported by set screws 69 so that the centers of the pivots 63 are a short distance below the line that passes through the centers of the shaft 57 and eccentric studs 65, thereby forming a toggle by which the bottom end of the swinging frame is held in a fixed position under ordinary pressure but will yield or move outwardly if the pressure becomes great enough to lift the weights 68.

By adjustment of the set screws 69 the pivots 63 may be moved toward the line joining the centers of the eccentric studs 65 and shafts 57 so that a greater pressure will be required to lift the weights 68 or may be moved away from such center line so that the weights will be lifted by less pressure. Further adjustments relative to pressure may be made by moving the weights 68 on the arms 67.

The distance between the bottom ends of the two swinging frame members as well as the angle of the toggle may be adjusted by turning the shaft 66 within a fixed tube 70 through which it extends, the shaft 66 being secured in adjusted positions within the tube 70 by a pin 71 that projects through perforations 72 in the tube and other perforations 73 in the shaft, the perforations 72 preferably being in alignment lengthwise of the tube while the perforations 73 are arranged in successively offset relation or spiral fashion around the shaft.

If the adjustment of the pivots 63 relative to the center of the shaft 57 and the eccentric studs 65 is disturbed by turning the shaft 66 it may be corrected by the adjusting screws 69.

The lower end of one only of the swinging frame members is herein shown as adjustably mounted and arranged to be moved by excess pressure while the lower end of the other swinging frame member is fixed relative to the side plates, but, it will be understood that the lower ends of both of such swinging frame members may be adjustably and yieldingly supported if desired.

The shafts 56 at the upper ends of the swinging frame members 58 are provided with eccentric end studs 74 that are adjustably secured by set screws 75 to the hubs 76 of adjusting plates 77. The ends of the plates 77 are provided with spring pressed plungers 78 that are arranged to enter perforations 79 in the side plates 35 to secure the upper ends of the swinging frame members in adjusted position.

When the set screws 75 are unscrewed and the shafts 56 turned with respect to the hubs 76, the upper sprocket wheels will be raised and lowered and the slat belts tightened or loosened by reason of the relative eccentricity of the shafts 56 and the studs 74.

The swinging frame members 58 are each provided on the front side with two longitudinal grooves or track channels 80 near the edges thereof in which the links 48 of the slat belts may run and are further provided between the track channels 80 with another channel 81 for the reception of the filtrate that passes through the filter belts, the filtrate channel 81 being separated from the track channels 80 by walls 82 that are preferably recessed for the reception of strips of packing 83 which make contact with the slat belts and prevent the passage of filtered liquor between the chambers 81 and 80.

At the outer sides of the track channels 80 are walls 84 which have longitudinally extending metallic packing strips 85 removably secured thereto and adapted to receive the edges of the filter belt which overlap the ends of the slats 47, the walls 84 having passageways 86 (see Fig. 13) formed therein to permit filtrate that seeps through and around the edges of the filter belt to enter the track channels 80.

Strips 87 of packing material are provided in the sides of the swinging frame members and such swinging frame members are secured to the side plates 35 at frequent intervals by screws 88 that project through suitable slots in the side plates thereby allowing for adjustment of the swinging frame members. The object of this packing strip is to provide a method of making the pressure chamber liquid tight at the joints at the sides of the adjustable swinging frames, supporting the moving filter fabric backing belt, which in turn supports the moving filter fabric belt.

For the purpose of removing the filtrate from the filtrate channel 81 at successive stages in the filtration process I have provided at different elevations a plurality of catch troughs 89 (see Fig. 2) whose inner ends project into the channels 81 and bear lightly against slats 47, the catch troughs being slidably disposed within tubular passageways 90 in the swinging frame members 58. The inner ends of the catch troughs 89 are cut away as shown to leave a relatively sharp upper edge adjacent the slat belts and bowl effect through which the filtrate liquor may enter the outlet passage.

The catch troughs 89 are tapped with outlet or drain pipes 91 that extend outwardly through slots 92 and 93 in the swinging frame members 58 and side plates 35 respectively and such catch troughs are yieldingly held in contact with the slats 47 by tension springs 94 that are connected with lever arms 95 on shafts 96 having pinions 97 that mesh with gear racks 98 on the bottoms of the catch troughs 89, slots 99 being provided in the side plates 35 and cylindrical recesses 100 being provided in the swinging frame member 58 to accommodate the shafts 96 and the pinions 97.

The catch troughs 89 may be made from cylindrical pieces of metal drilled throughout the greater portion of their length, plugged at the outer end, notched on the top side near the inner end as shown and having the gear racks 98 cut on the bottom side thereof.

On the two lowermost oppositely disposed catch troughs 89, the outlet pipes 91 are connected with each other by a tension spring 101 which holds such catch troughs in contact with the slats 47 and eliminates the rack and pinion mechanism with which the other catch troughs are provided.

The bottom filtrate catch troughs 89 will almost always be in use but in many classes of work it may be of advantage to disconnect the springs from some or all of the upper catch troughs so that the inner ends of such troughs will be withdrawn from the filtrate channel 81, the filtrate catch troughs 89 constituting means for keeping the filtrate from different stages of the filtration process separate. It will be understood that the liquors filtering through the filter fabric before a deposit of sediment has accumulated, may be cloudy, also different liquids may have a different degree of flowability as in the case of separating oil and glue stock from cooked and partially evaporated fish pulp. The oil filters out first and the glue stock later. In such case the oil will deliver from the upper catch troughs and the glue stock from the lower catch troughs, with the intermediate catch troughs delivering a mixture of the two liquids.

Disposed below the slat belts are catch pans 102 having outlets 103 and having relatively thin edges 104 which engage with the external surfaces or back side of the filter belts 39 to remove any liquor which may adhere thereto or run down the belts.

The solid matter that does not pass through the filter belts may discharge into a trough 105 which extends crosswise of the bottom of the frame and which has a conveyor screw 106 operatively disposed therein. Scrapers 107 may project upwardly from the trough and engage with the filter belts 39 to scrape material off of such belts and cause it to drop in the trough 105.

Power from any suitable source may be transmitted by sprocket wheel 108 to shaft 109, (see Fig. 3), which has worm 110 which meshes with worm wheel 111 and drives shaft 112 and gearwheel 113, which meshes with gearwheel 114 and thereby drives the shaft 57 and sprocket wheels 55 at the lower end of one of the swinging frame members 58. The shaft 57 at the bottom end of the other swinging frame member 58 has a gearwheel 115 which is driven from a corresponding gearwheel 116 on the opposite shaft 57 through two intermediate gearwheels 117 and 118.

The gearwheel 118 is mounted on a bearing 119 which also serves as a pivot for a swinging plate 120 which carries a bearing stud 121 on which the gearwheel 117 is mounted, the bearing stud 121 being adjustable lengthwise of the plate 120 as by means of a slot 122 and the outer end of the plate being adjustably held by bolt 123 that projects through curved slot 124 in the plate so that the gearwheel 117 may be replaced by a gearwheel of either larger or smaller size which makes it possible to drive the two filter belts at different rates of speed.

The conveyor screw 106 is mounted on a shaft 125 which is connected by spiral gears 126 with vertical shaft 127 which is in turn connected by other spiral gears 128 with the driven shaft 109 so that the conveyor screw is driven from the shaft 109.

Material to be filtered may be introduced into the filter pressure chamber 40 through a pipe 129 which may be connected with a pump, not shown, or with any other device for introducing the same under pressure. The upper side of the pipe 129 is preferably perforated so that when liquid material is being introduced such material will be directed upwardly in the form of jets as shown in Figs. 1 and 2, to agitate the mass and so provide a more uniform filtration. Also air may be pumped in with the liquids to act as air agitation means, escaping through the filter belt.

The upper end of the filter pressure chamber 40 is closed by a packing member comprising one or more rectangularly shaped blocks or plugs 130 which are tapered to fit between the filter belts 39 and which are provided on the inclined sides and in contact with the filter belts and the side walls with friction plates 131 preferably of flexible material as leather which project below the edges of the blocks 130 as shown so that pressure from within the chamber 40 will tend to press them outwardly against the belts 39 and the side walls 35.

In the drawings I have shown two of the packing blocks 130 adjustably mounted on supporting rods 132 which are secured to a cross bar 133 on the top of the filter press frame, the blocks 130 being arranged to be raised or lowered independently of each other by the manipulation of nuts 134 to compensate for wear and for movement toward or away from each other of the swinging frame members 58 which carry the filter and slat belts.

Figure 14:
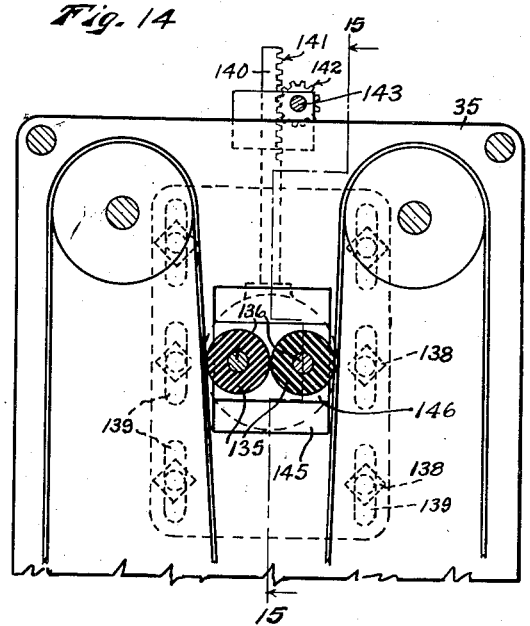
Fig. 14 is a somewhat diagrammatic fragmentary sectional view showing antifriction packing means in the form of two rubber rollers which may be interposed adjustably between the two filter belts.
Figure 15:
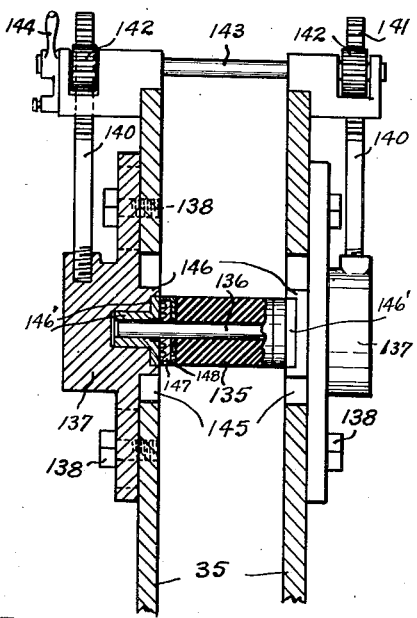
Fig. 15 is a vertical sectional view substantially on a broken line 15, 15 of Fig. 14.

Figs. 14 and 15 show antifriction packing means for closing the upper end of the filter pressure chamber, comprising two rollers 135, preferably of rubber or similar elastic composition, having axial shafts 136 which are journaled in blocks or plates 137, which in turn are adjustably secured to the exterior of the side plates 35 by screws 138 which extend through vertical slots 139 in the plates 138. One of the plates 137 is provided on each side of the frame and such plates are connected with vertical adjusting bars 140 having rack teeth 141 at the upper ends which mesh with pinions 142 on a shaft 143. A lever 144 having suitable releasable catch means by which it may be locked in adjusted positions is provided on the end of the shaft 143 for turning such shaft to simultaneously raise or lower the plates 137. The side plates 35 are slotted or cut away as at 145 to permit protuberances 146 on the plates 137 to move vertically therein and the bearings on the shafts 136 are preferably formed by blocks 146' which are disposed in slots, in the plates 137 and have a limited amount of sidewise movement to compensate for wear of the rollers 135. The ends of the rollers 135 are preferably provided with metal disks 147 which bear against the plates 137 and with leather washers 148 whose edges are turned or cupped over the edges of the disks 147.

As the filter belts 39 move downwardly the rollers 135 which are in close contact therewith will roll with very little friction and at the same time will prevent the upward passage of the material with the filter pressure chamber. The elasticity of rollers 135 themselves will hold the ends of the same securely in contact with the plates 137 and prevent leakage of material past such ends.

Figures 16, 17:
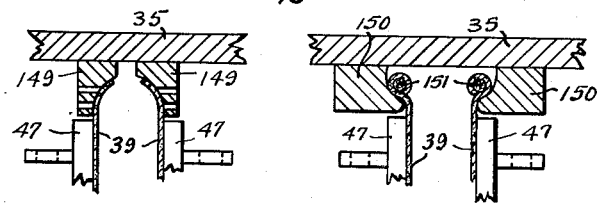
Figs. 16 and 17 are fragmentary sectional views illustrating two different ways of constructing packing strips for the edges of the filter belt.

Fig. 16 shows vertically arranged packing strips 149 which are curved on their inner surfaces so that the overlapping edges of the filter belts 39 will be bent inwardly. The packing strips 149 may be perforated to permit filtrate to pass therethrough.

Fig. 17 shows packing strips 150 which have belt receiving surfaces curved in an opposite direction from those shown in Fig. 16 so that the edges of the filter belts 39 will be curved outwardly or away from each other. When packing strips of this form are used the edge of the belt that slides on such strips may be reinforced by a cable 151 which is fastened in the edge of the belt.

The packing strips shown in both of Figs. 16 and 17 may be carried on the edges of the swinging frame members 58 similarly to the packing strips 85.

Figure 18:
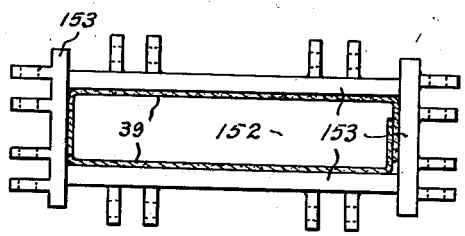
Fig. 18 illustrates a modified form of the invention in which a single belt extends entirely around the interior of a closed filter chamber which is formed of moving slats.

In Fig. 18, I have shown how an enclosed filter pressure chamber 152 may be formed from a single filter belt 39 of sufficient width to extend entirely around the filter pressure chamber and permit the edges to lap over each other, the filter belt in this form of construction being supported on four sides by slat belts 153 of a form similar to the slat belts hereinbefore described.

Fig. 19 shows elastic yielding means for supporting the lower ends of the swinging frame members so that excess pressure will move such frame members apart without breaking the same, which means comprises a lever arm 156 pivoted at the bottom end to a fixed support 157 and connected by a link 158 with the lower end of a swinging frame member 58. The upper end of the lever arm 156 is connected by a suitable piston rod with a piston 159 in a hydraulic cylinder 160 which is connected by a relatively small pipe 161 with a combined hydraulic and pneumatic container 162 into which an elastic fluid as compressed air and a non-elastic fluid as water or oil may be introduced through a pipe 163. The container 162 is provided with a pressure gauge 164 and a liquid gauge 165 both of well known form.

In operation the swinging frame is normally held in the proper position by the pressure of the elastic fluid in the upper portion of the container 162. If the pressure on the swinging frame member becomes excessive the pressure exerted by the piston 159 on the liquid within the cylinder 160 will force a portion of such liquid through the tube 161 into the container 162 against the pressure of the elastic fluid in the upper portion of such container thus permitting the lower end of the swinging frame to move outwardly and relieve the excess pressure. As soon as the pressure of the swinging frame member is reduced liquid will be forced back into the cylinder 160 and the swinging frame member will tend to move back to its original position. Pressure applied against the bottom of the swinging frame which will also regulate the size of the discharge opening and correspondingly the pressure in the pressure chamber is at all times controllable and adjustable by varying pressure of the air in chamber 162 by means of a pump (not shown) and the pipe 163.

In Fig. 20 is shown a slotted nozzle effect, adapted to blow air through the filter belt from the outside, thus tending to free the solid matter adhering to the inner surface. Fig. 20 shows a filter device in which the filter belts 39 are reinforced and carried on belts 166 of woven wire or wire mesh that runs on rollers 167. The wire mesh belts 166 are held in contact with the lower driving rollers 167 to prevent slippage by flexible belts 168 which are mounted on small rollers 169 adapted to be adjusted for changing pressures.

The wire mesh belts are carried on swinging frame members 170, each of which has a plurality of filtrate receiving chambers as the chambers 171, 172, and 173 provided therein at successive elevations. The walls of the swinging frame members 170 against which the wire mesh belts 166 bear may be corrugated to reduce friction and perforated to permit the passage of filtrate therethrough. Horizontally arranged strips of packing material 174 are held in contact with the rear sides of the wire mesh belts 166 by screws 175 at locations where it is desired to prevent the passage of liquor as between adjacent filtrate chambers. The upper filtrate chambers 171 may be used for taking off the filtrate which is often clear and relatively free of impurities and which may thus be preserved separately from the remainder of the filtrate, which is taken off in the larger chambers 172. The lower smaller chambers 173 which are opposite each other are connected separately with pipes 176 so that different pressures may be maintained in such two chambers to assist in the final separation, as for instance, air, water, or steam may be introduced under pressure into one of said lower chambers 173 and forced through the mass of residue between the belts 39 into the other chamber 173 to extract filtrate material that might otherwise be discharged with the solid matter. In such case water may replace the valuable liquids to be recovered in the capillary spaces of the solids residue, thus a greater recovery is possible as even the capillary spaces have been emptied of valuable liquids.

In Figs. 21 and 22 I have shown strips of filter material 177 secured to slats 178 in such a manner that the edge of one strip will overlap the strip on the next adjacent slat and also overlap the side packing strip thus providing a shingling effect, thereby forming a continuous filter body through which material may be filtered in the same way that it is filtered through the filter belts 39. The slats 178 are perforated to permit the passage of filtrate therethrough and each of such slats preferably has tongues 179 at intervals along one edge thereof that project into notches in the next adjacent slat and bridge the gap between the slats so that the strips 177 will not be forced between the slats.

To make sure that the edges of the filter strips 177 will always lie in snug contact with the next adjacent strip I provide, at the point where the belt passes around the sprocket wheels which carry the same, one or more rollers 180 arranged so that they will bend the overlapping edges of the strips inwardly. The rollers 180 are also preferably provided with end flanges 181 which are arranged to bend the portions of the belt which overhang the ends of the slats inwardly so that they will make close contact with the packing strips on which they slide. This arrangement does away with two separate belts and the complications incident thereto.

In Fig. 23 I have shown a corrugated perforated wall 182 which may be used as a support for a wire mesh belt 166 which carries a filter belt 39 and have further shown a side packing strip 183 over which both the filter belt 39 and the wire mesh belt 166 may lap and which is perforated to permit the discharge of filtrate into a passageway or filtrate chamber 184. This provides for the separation of the cloudy filtrate escaping around the side of the filter belt from the clear filtrate passing through the more central portion of the filter belt.

Figure 24:
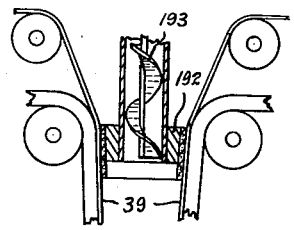
Fig. 24 is a partly diagrammatic sectional view showing a packing member supported between two filter belts and having a feed screw extending therethrough by which material may be forcibly introduced into the filter chamber.

Fig. 24 shows a packing block 192 having a conveyor or feed screw 193 connected therewith by which solid material may be introduced under pressure into the filter pressure chamber. The block 192 is similar to the blocks 130 shown in Fig. 2 and is introduced between the filter belts 39 at the top of the filter chamber in a similar manner. Manifestly, it is only necessary in connection with a "press" which embodies my invention to provide a packing block of one of the forms herein set forth to convert said press into a "filter press", when there is means provided for the introduction under pressure of material to be separated such as obtains in the feed screw or in the pump arrangement.

Figure 25:
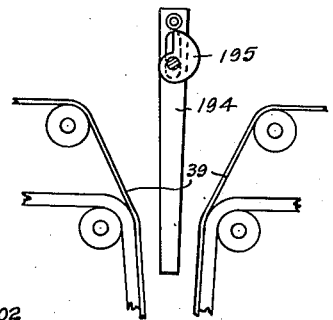
Fig. 25 is a somewhat diagrammatic view illustrating the use of a tamping bar for facilitating the feeding of material between two filter belts.

Fig. 25 shows a tamping bar 194 that may be reciprocated as by cam 195 and is arranged so that it will tamp material between the filter belts 39 to provide a uniform initial compacting of the material to be separated.

Figure 26:
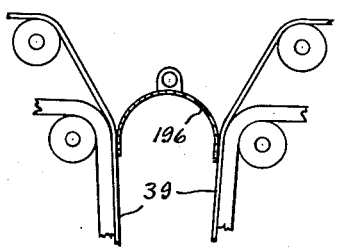
Fig. 26 is a diagrammatic view illustrating an arcuate packing member of flexible metal interposed between the two filter belts.

Fig. 26 shows a flexible packing member 196 of substantially semicircular cross sectional shape arranged to have its two ends inserted between the filter belts 39 so as to close the opening at the upper end of the filter pressure chamber and to be expanded against the filter belts by its own elasticity and by pressure within the filter chamber.

Figure 27:
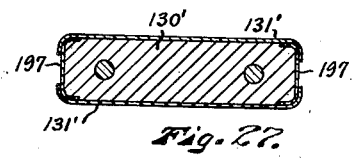
Fig. 27 is a view in cross section of a packing block which may be used between the two filter belts.

Fig. 27 shows a packing block 130' having pieces of packing material 197 on the ends that extend around the corners thereof on the insides of the flexible friction plates 131' in such a manner as to form tight corner joints and provide for an extension of the elastic packing. The end pieces 197 are not shown on the packing blocks 130 in Figs. 1 and 2.

Figure 29:
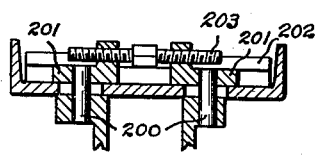
Fig. 29 is a sectional view substantially on a broken line 32, 32 of Fig. 31.
Figure 28:
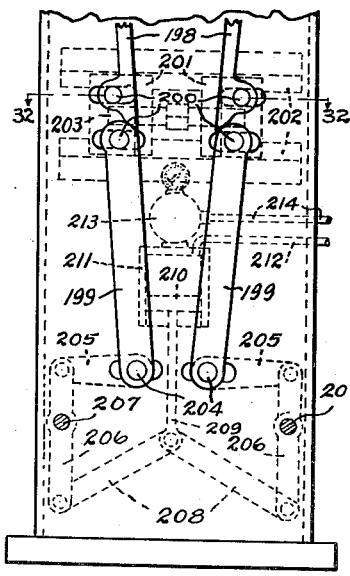
Fig. 28 is a diagrammatic view showing both adjustable non-yielding mechanical devices and adjustable yielding hydraulic and pneumatic devices for supporting the ends of the jaw members.

Figs. 28 and 29 show swinging frame members 198 that correspond in purpose and function to the swinging frame members 58 and that are connected at their lower ends with extension frame members 199 which are movable at both top and bottom ends. The bottom ends of the swinging frame members 198 and the top ends of the extension frame members 199 are connected by pins 200 with two blocks 201 which are movable in guides 202 on the exterior of the side plates of the filter press and which are connected by right and left hand screws 203 in such a manner that the turning of the screw will move the blocks 201 and the frame members 198 and 199 which are connected with such blocks either toward or away from each other. By the above described form of construction the opposite swinging frame members are tied together so that the pressure therebetween will be sustained by the screws 203 and the sides of the frame will be relieved of strain. The mechanism just described is necessarily in duplicate on opposite sides of the frame.

The lower ends of the extension frame members 199 are connected by pins 204 with links 205 which are connected with the upper ends of lever arms 206 which are secured to transverse rocker shafts 207. The lower ends of the lever arms 206 are connected by toggle links 208 with a piston rod 209 having a pistol 210 which is reciprocable in a cylinder 211. The cylinder 211 is provided with an inlet pipe 212 for non-elastic fluid and is connected with a chamber 213 wherein elastic fluid as air may be introduced through a pipe 214 so that the cylinder 211 and chamber 213 act in the manner hereinbefore described in connection with the similar cylinder 160 and chamber 162 of Fig. 19 to permit the lower ends of the extension frame members 199 to move apart under excessive pressure and to move the same together when the excessive pressure is lessened. If when the two swinging frames separate against the pressure control and permit a thicker layer of solids to form, so that the opening cannot under the elastic pressure return to normal, one belt can be retarded and so reduce the discharge so that automatic pressure release can return same to normal.

The rocker shafts 207 extend across the frame and connect the operating mechanism on both sides so that both sides of the extension members 199 will move simultaneously thereby avoiding twist and unnecessary strain. The toggle links 208 afford a powerful leverage for resisting force tending to move the lower ends of the extension frame members 207 apart and multiplying the force that is exerted by the piston rod 209 for moving such extension frame members together.

Figure 30:
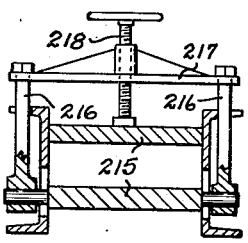
Fig. 30 is a sectional detail view showing one manner of adjustably connecting the two oppositely arranged swinging frame or jaw members with each other in such a manner as to balance pressures and relieve the side plates of strain.

In Fig. 30 I have shown two swinging frame members 215 adjustably connected with each other by links 216, cross bar 217 and thrust screw 218 in such a manner that the outward thrust on one frame member will be balanced by the outward thrust on the other frame member and the side frame members will be relieved of strain.

In operation the filter belts 39 are caused to move through the filter chamber from upper to lower end thereof and then to return to the upper end of the filter press on the exterior of the filter pressure chamber. Material from which liquid is to be extracted is introduced at or near the upper end of the filter chamber and is drawn downwardly in the convergent chamber by the moving belts with the result that the liquid contents are forced through the filter belts while the solid matter is eventually discharged at the lower end. The slats 47 which support the filter belts are grooved and perforated in such a manner as to direct the filtered material into the filtrate channels 81 from which it may be removed by the catch troughs 89, the said catch troughs constituting means for keeping the filtrate from different stages of the filtration process separate. The filtrate which passes through the edges of the filter belts and which leaks under such edges is liable to be cloudy and to contain impurities and hence especial precautions are taken to prevent such filtrate from the edge from gaining access to the main filtrate chamber 81. The perforations 86 shown in Fig. 13 and the arrangement of the grooves 52 in the slats 47 as shown in Fig. 10, serve to direct the liquor from near the edges into the track channels 80, from where it is returned to the pressure chamber for re-separation as is the cloudy filtrate from the upper catch troughs where desired.

The packing strips 85 on which the edges of the filter belts 39 travel are subjected to greater wear than other parts of the swinging frame members and are made separable therefrom so that they may be removed.

The provision of means by which the two filter belts may be moved at different rates of speed is of advantage in the handling of certain classes of materials, for example, in the handling of impervious materials which must be worked over and over in order to bring the liquids interspersed therethrough to the outside surface so that said liquids may be free to come in contact with the filter belt and be removed thereby. The provision of releasable supporting means for the lower ends of the swinging frame members 58 eliminates the danger of damage to the machine by excessive pressure.

The packing devices for closing the opening at the top of the filter chamber as shown in Figs. 2, 14 and 26 are necessary to the successful operation of the machine on materials of some classes.

The operation of the filter device embodying my invention has been set forth in connection with the description of the parts of my invention and will be readily understood by those skilled in the art when reference is had to the drawings.

Obviously, changes may be made in the forms, dimensions, and arrangement of the parts of my invention, without departing from the principle thereof, the above setting forth only preferred forms of embodiment.

I claim:—

1. A filter device embodying a filter tight filter chamber closed top, bottom, and sides; a traveling filter belt forming one wall of said filter chamber; and a stationary plug means disposed within and closing substantially liquid tight one end of said chamber, said plug means having throughout its peripheral portion a packing means mounted thereon, which packing means is in contact with all the walls of said filter chamber.

2. A filter device embodying a filter tight filter chamber closed top, bottom, and sides; a traveling filter belt forming one wall of said filter chamber; and a stationary plug means disposed within and closing substantially liquid tight one end of said chamber, said plug means having throughout its peripheral portion a packing means mounted thereon, which packing means is in contact with all the walls of said filter chamber, and has a relatively short portion of said packing means extending throughout said peripheral portion into said chamber, which portion is held with substantially liquid tight force against the walls of the filter chamber by the pressure exerted through the material being filtered, whereby friction on the moving belt is minimized in producing said liquid tight chamber.

3. A filter device embodying a wedge shaped filter tight filter chamber, closed top, bottom, and sides; a traveling filter belt forming one wall of said filter chamber; and a stationary plug means, adjustable longitudinally of the filter chamber, disposed within and closing substantially liquid tight one end of said chamber, said plug means having throughout its peripheral portion a packing means mounted thereon, which packing means is in contact with all the walls of said filter chamber, and has a relatively short portion of said packing means extending throughout said peripheral portion into said chamber, which portion is held with substantially liquid tight force against the walls of the filter chamber by the pressure exerted through the material being filtered, whereby friction on the moving belt is minimized in producing said liquid tight chamber.

4. A filter device embodying a filter tight filter chamber; a traveling filter belt forming one wall of said filter chamber; a stationary plug means disposed within and substantially closing liquid tight one end of said chamber, said plug means having throughout its peripheral portion a packing means mounted thereon, which packing means is in contact with all the walls of said filter chamber, and an inlet means extending through said plug means for the introduction under pressure of the material to be filtered.

5. A filter device embodying a filter tight chamber closed top, bottom and sides; a traveling filter belt forming one wall of said chamber; and a stationary plug means disposed within and substantially closing liquid tight one end of said chamber, said plug means having, (a) throughout its peripheral portion a packing means mounted thereon, which packing means is in contact with all the walls of said filter chamber, (b) a flexible portion of said packing means extending throughout said peripheral portion into said chamber, which portion is held with substantially liquid tight force against the walls of the filter chamber by the pressure exerted through the material being filtered, and (c) an inlet means extending through said plug means for the introduction under pressure of the material to be filtered.

6. A filter device embodying means forming a filter chamber; a traveling filter belt forming a wall of said filter chamber; and packing rollers contacting said filter belt and forming another wall of said filter chamber.

7. A filter device embodying means forming a filter chamber; two traveling filter belts spaced apart relative to each other and forming opposite walls of said filter chamber; packing rollers operatively positioned between said filter belts and forming a closure for one end of said filter chamber; and means adjustably supporting said packing rollers.

8. A filter device embodying means forming a vertically disposed filter chamber; a filter belt forming a traveling wall within said filter chamber; and a traveling slat belt supporting said filter belt, the slats of said slat belt having transverse grooves and having perforations extending from said grooves through said slats, whereby liquid may discharge through said slat belt.

9. A filter device embodying a traveling slat belt, the edges of the slats of said belt being respectively provided with rabbeted interfitting tongue and groove means forming ship lap joints affording a substantially solid straight wall and capable of passing around curves, the slats forming said slat belts having grooves on their inner surfaces and having drainage perforations extending from said grooves outwardly through said slats.

10. A filter device embodying means forming a filter chamber; an endless filter belt forming one wall of said filter chamber; shaft means carrying said endless filter belt; movable bearings for said shaft means; toggle links retaining said bearings; and means yieldingly holding said toggle links in a slightly dis-aligned off-center position, whereby said bearings will be held fixed and immovable for normal pressures against said filter belt but will be permitted to yield in response to excessive pressures against said filter belt.

11. A filter device embodying means forming a filter chamber; a filter belt forming one wall of said filter chamber and subject to the pressure within said chamber; a shaft supporting one end of said filter belt; movable bearings for said shaft; a pair of toggle links retaining each of said bearings against movement; stop means normally maintaining each pair of toggle links in slightly dis-aligned normal position; means for adjusting the position of one of the pivots of said toggle links, whereby the dis-alignment of said links for the normal position will be varied; and yielding means resisting movement of said toggle links away from the normal position.

12. In an apparatus of the class described, a fixed support; two spaced apart frame members inclined relatively to each other in an uprightly disposed position; pivot mountings carried by said fixed support, engaging said frame members in their upper end portions, said pivot mountings supporting the weight of said frame members and freely suspendedly mounting said members; and resilient means urging the freely movable lower end portions of said frame members relatively toward each other in opposition to the stresses developed during the separating operation, whereby the nicety of adjustment of the resilient means urging said members toward each other during the separating operation is unaffected by the weight of the frame members.

13. In an apparatus of the class described, two inclined freely suspendedly pivotally mounted frame members spaced apart to form a pressure chamber therebetween, said frame members being free to move toward and away from each other below said pivots and lateral supports connected with the lower ends of said frame members compelling during the separating operation equal movement toward and away from each other of the lower end portions of said frame members when forced apart by expressing stresses.

14. In an apparatus of the class described, a fixed support; two spaced apart frame members inclined relatively to each other in an uprightly disposed position; a pivotal mounting carried by said fixed support engaging one of said frame members in its upper end portion, said pivotal mounting supporting the weight of said frame member and freely suspendedly mounting said member; and resilient means urging the free movable lower end portion of said pivotally mounted frame member toward the lower end of the other frame member during the separating operation, whereby the nicety of adjustment of the resilient means urging said pivotally mounted member toward the other frame member during the separating operation is unaffected by the weight of the frame member.

15. In a device of the character described a slat belt comprising perforated slats having mounted on the face thereof a filter member, each member extending beyond the trailing edge of the slat on which it is mounted and over the advancing edge of the next following slat, whereby is provided a combined reinforcing slat and filter belt.

16. In a device of the character described, embodying a filter chamber; two oppositely disposed frame members extending the length of said chamber, one of which members is pivotally mounted as respects one end portion, and the other end portion being resiliently mounted; a belt for each of said frame members movably mounted thereon; a rotatable shaft mounted on the resiliently mounted end portion of said pivotally mounted frame member; a driving means mounted on said shaft; and power driven transmitting means connected to said driving means.

17. In a device of the character described embodying a filter chamber; two substantially vertically and oppositely disposed frame members extending the length of said chamber, one of which members is pendently mounted; a belt for each of said frame members movably mounted thereon; a rotatable shaft mounted on the lower end portion of each of said frame members; a driving means mounted on said shaft; and power transmitting means connected to said driving means.

18. In a device of the character described embodying a filter chamber; two substantially vertically and oppositely disposed frame members extending the length of said chamber, one of which members is pendently mounted; a belt for each of said frame members movably mounted thereon; a rotatable shaft mounted on the lower end portion of each of said frame members; a driving means mounted on said shaft; power transmitting means connected to said driving means; and means resiliently supporting the lower end portion of said pendently mounted frame member in spaced relation to the lower end portion of the oppositely disposed frame member, whereby varying pressures during the expressing operation are provided, which result in the efficient expression of the liquids from the solids.

19. In a device of the character described embodying a filter chamber; two substantially vertically and oppositely disposed frame members extending the length of said chamber, one of which members is pendently mounted; a belt for each of said frame members movably mounted thereon; a rotatable shaft mounted on the lower end portion of each of said frame members; a driving gear mounted on each of said shafts; and a timing gear disposed beneath and intermeshing with each of said driving gears—said timing gears also intermeshing inter se, whereby relative movement between the lower end portions of the frame members is provided and the movement of the belts is controlled.

20. In a device of the character described embodying a filter chamber; two substantially vertically and oppositely disposed frame members extending the length of said chamber, one of which members is pendently mounted; a belt for each of said frame members movably mounted thereon; a rotatable shaft mounted on the lower end portion of each of said frame members; a timing gear mounting shaft disposed beneath one of said driving gears; an adjusting plate pivotally mounted on said shaft; means to selectively lock said plate in a predetermined position; an adjustably mounted bearing carried by said plate; a timing gear mounted on said shaft and intermeshing with the driving gear disposed thereabove; and a second timing gear mounted on said adjustably mounted bearing and intermeshing with the driving gear disposed thereabove and with said other timing gear.

21. In a device of the character described, having two swinging belt supporting members; a toggle mechanism connecting the ends of said members, comprising a pivotally mounted link for each of said frame members; links pivotally connecting one end of each of said pivotally mounted links to one end of said belt supporting members; a pair of links pivotally connected and having the other end of each link connected to the other end of said first mentioned links; and resilient means connected to the pivotal connection of said pair of links, whereby equal movement of the end portions of said belt supporting members, either to or from each other, is provided.

ROBERT M. THOMPSON.